United States Patent [19]

Kikuchi et al.

[11] Patent Number: 4,650,523

[45] Date of Patent: Mar. 17, 1987

[54] CEMENT ACCELERATING AGENT

[75] Inventors: Masatsune Kikuchi, Kiyose; Satoru Matsui, Musashino; Hiroshi Omori, Ichikawa; Masao Shimoda, Tokyo, all of Japan

[73] Assignee: Onoda Cement Co., Ltd., Yamaguchi, Japan

[21] Appl. No.: 735,791

[22] Filed: May 17, 1985

[30] Foreign Application Priority Data

Jun. 8, 1984 [JP] Japan .................................. 59-116627
Jul. 12, 1984 [JP] Japan .................................. 59-143239

[51] Int. Cl.$^4$ .............................................. C04B 22/14
[52] U.S. Cl. ....................................... 106/315; 106/85; 106/89
[58] Field of Search ..................... 106/85, 89, 314, 315

[56] References Cited

U.S. PATENT DOCUMENTS

| | | | |
|---|---|---|---|
| 3,140,956 | 7/1964 | Kamlet et al. | 106/89 |
| 3,782,991 | 1/1974 | Burge | 106/315 |
| 3,826,663 | 7/1974 | Minicozzi et al. | 106/314 X |

*Primary Examiner*—William R. Dixon, Jr.
*Assistant Examiner*—Karl Group
*Attorney, Agent, or Firm*—Abelman Frayne Rezac & Schwab

[57] ABSTRACT

Initial setting, initial adhesion and long-term stability of mortar and concrete can be improved by use of a cement accelerating agent comprising (1) calcined alunite, a carbonate and lime, (2) calcined alunite, a carbonate and an aluminate, or (3) calcined alunite, a carbonate, an aluminate and lime.

5 Claims, 3 Drawing Figures

CEMENT ACCELERATING AGENT

BACKGROUND OF THE INVENTION

This invention relates to a cement accelerating agent to be added to cement of a Portland cement type for improving initial adhesion and initial setting of cement mortar or concrete for spraying on tunnel surfaces, side-slopes, structures and bridge understructures.

The cement referred to in the present invention is normal Portland cement and high early-strength Portland cement. Cement, other than used in Example 14, is "normal Portland cement."

In general, rapid development of initial setting is required for cement mortar and concrete. For example, when mortar or concrete is sprayed on a vertical or sloped surface of a tunnel ceiling or a bridge understructure, the mortar or concrete must develop a bonding strength to hold the mortar or the concrete itself on the ceiling surface within 30 seconds after spraying, and thereafter curing proceeds gradually to develop enough strength to hold the weight of the mortar or concrete.

Further, when mortar or concrete is sprayed on a tunnel ceiling where water flows out, on a loosened hill surface, for stopping water or for emergency repair, the start of initial setting in 1.5 to 3 minutes is too slow and unacceptable, and setting must start in seconds.

Heretofore, various cement accelerating agents have been added to mortar and concrete. Cement accelerating agents that have been used for the above purpose include (1) water glass-based agents, (2) aluminate-based agents, and (3) calcined alunite-based agents. However, the above cement accelerating agents have been found defective for the following reasons.

(1) Water glass-based agents

The strength does not increase after setting, there is insufficient long-term stability, there is a high pH of itself, and there is the possibility of Na pollution.

(2) Aluminate-based agents

The setting time and initial strength of the mortar or concrete to which a cement accelerating agent comprising sodium aluminate and sodium carbonate is added is greatly affected by the quantity of the added agent. This type of cement accelerating agent absorbs moisture and has a high pH value and provides insufficient storage stability. For example, an accelerating agent comprising calcium aluminate which is contained in aluminate cement, sodium sulfate and slaked lime has an insufficient initial setting property and insufficient storage stability. An accelerating agent comprising alkali aluminate and alkali carbonate causes abrupt variation in setting time and initial strength by the quantity of the added agent and has insufficient short-term strength. An accelerating agent comprising calcium haloaluminate and alkali carbonate rapidly sets after 30 seconds from spraying and tends to result in high scattering rate in spraying.

(3) Calcined alunite-based agents

An accelerating agent based on calcined alunite and gypsum has low initial adhesion and a slow initial setting property.

Thus, conventional cement accelerating agents have been found defective for the above-described reasons, and an accelerating agent that enhances the initial setting performance of mortar and concrete and has good durability is required.

SUMMARY OF THE INVENTION

With a view to obviate all of the conventional art defects of cement accelerating agents, it is a primary object of the present invention to provide cement accelerating agents for mortar and concrete, which enhance the initial setting performance of mortar and concrete, have good durability and harden in seconds.

In accordance with the present invention, which attains the above objectives, there is provided a first cement accelerating agent comprising 50 to 85 weight %, preferably 60 to 80 weight % of calcined alunite, 15 to 30 weight %, preferably 15 to 25 weight % of a carbonate and 1 to 25 weight %, preferably 5 to 15 weight % of a lime, a second cement accelerating agent comprising 50 to 95 weight %, preferably 60 to 70 weight % of calcined alunite, 5 to 30 weight %, preferably 10 to 15 weight % of a carbonate and 1 to 30 weight %, preferably 15 to 25 weight % of an aluminate, and a third cement accelerating agent comprising 50 to 90 weight %, preferably 50 to 70 weight % of calcined alunite, 5 to 30 weight %, preferably 10 to 20 weight % of a carbonate, 5 to 30 weight %, preferably 10 to 25 weight % of an aluminate and 0.1 to 25 weight %, preferably 10 to 25 weight % of a lime.

BRIEF DESCRIPTION OF THE DRAWINGS

FIGS. 1, 2 and 3 are graphics showing results of Example 3 of the present invention.

DETAILED DESCRIPTION OF THE INVENTION

Figure 1A:
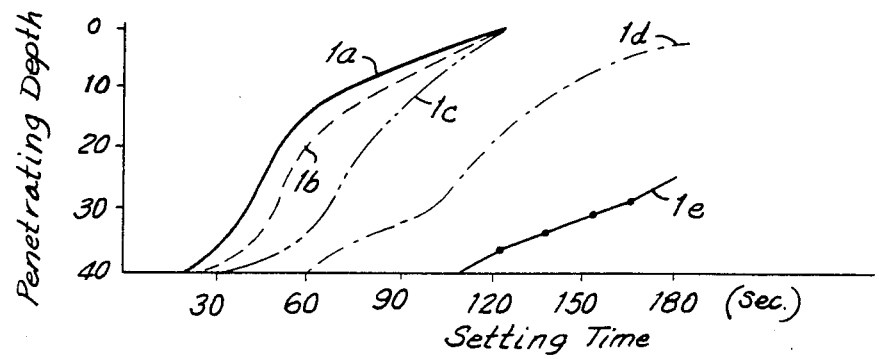

As described above, the cement accelerating agents according to the present invention are mainly based on calcined alunite and provided with improved initial setting or initial adhesion by the following combinations of ingredients.

A. Calcined alunite, carbonate and lime
B. Calcined alunite, carbonate and aluminate
C. Calcined alunite, carbonate, aluminate and lime.

As described above, calcined alunite has been used for cement accelerating agent in combination with gypsum. By virtue of the present invention, conventional art defects of an accelerating agent comprising calcined alunite and gypsum are eliminated, both in the initial adhesion and initial setting.

The cement accelerating agents according to the present invention use a carbonate and a lime in lieu of gypsum, wherein the setting time of the cement is remarkably reduced and initial adhesion and setting are improved by a synergetic action of calcined alunite, lime and carbonate. Though the basic mechanism of such an effect is not completely clarified, it can be considered as due to the fact that hydration of calcined alunite and lime is greatly accelerated by the addition of an alkali carbonate and the resultant heat of hydration accelerates the hydration of the cement.

Further, in the cement accelerating agents according to the present invention, a carbonate and an aluminate are used in lieu of gypsum to remarkably improve the time of the initial setting, thereby obtaining a setting time in seconds.

Further, the characteristics of an accelerating agent comprising calcined alunite, a carbonate and an aluminate can be further improved by adding lime to the composition.

Calcined alunite used in the cement accelerating agents according to the present invention is prepared by calcining and activating aluminum alunite or iron alunite at a temperature between 350 and 750 degrees C., preferably between 500 and 700 degrees C., and pulverizing to more than 3,000 cm²/g, preferably 4,000 to 6,000 cm²/g, of specific surface area determined by the Blaine permeability method (hereinafter simply referred to as Blaine specific area). An alunite calcined at a temperature below 350 degrees C. is long in setting time and small in strength after setting.

When aluminum alunite or iron alunite is calcined at a temperature between 350° and 750° C., the following decomposition reactions take place.

$$K_2O \cdot 3Al_2O_3 \cdot 4SO_3 \cdot 6H_2O \rightarrow Al_2(SO_4)_3 \cdot K_2SO_4 + 2Al_2O_3 + 6H_2O$$

$$K_2O \cdot 3Fe_2O_3 \cdot 4SO_3 \cdot 6H_2O \rightarrow K_2SO_4 \cdot Fe_2(SO_4)_3 + 2Fe_2O_3 + 6H_2O$$

The effects of the present invention as described above are obtained through synergistic actions of $Al_2(SO_4)_3 \cdot K_2SO_4$ and $Al_2O_3$, or $K_2SO_4 \cdot Fe_2(SO_4)_3$ and $Fe_2O_3$ with lime and carbonate. Specifically, when aluminum alunite is heat-decomposed at a temperature of 750° C. or less, the resultant $Al_2O_3$ is amorphous, thereby providing an improved setting property.

The carbonate used in the above formulations can be an alkali metal salt such as sodium carbonate or potassium carbonate.

The particle size of the carbonate is less than 1.2 mm, preferably less than 0.6 mm.

The aluminate used in the above formulation can be an alkali metal salt such as sodium aluminate or potassium aluminate.

The particle size of the aluminate is less than 1.2 mm, preferably less than 0.6 mm.

The lime can be quicklime or slaked lime. The Blaine specific surface area of the lime is more than 6,000 cm²/g, preferably 6,000 to 10,000 cm²/g.

The quantity of the accelerating agent according to the present invention added to the cement is 3 to 8 weight %. When the amount of the accelerating agent added is less than 3 weight %, the accelerating property is suddenly decreased. On the other hand, when addition quantity of the accelerating agent is more than 8 weight %, the accelerating property gradually decreases.

The present invention will be described in detail referring to the examples.

EXAMPLE 1

The cement accelerating agents based on calcined alunite according to the present invention (sample Nos. 7 and 8) were compared with conventional accelerating agents comprising gypsum and calcined alunite (sample Nos. 1 through 6). The results are shown in Table 1. The calcined alunite used was prepared by calcining alunite at 650 degrees C. and its content was 5.0%, pulverized to 4,000 cm²/g Blaine of specific surface area. The Blaine specific surface area of the slaked lime was 5,300 cm²/g, that of Type II anhydrous gypgum was 5,800 cm²/g, and the sodium carbonate was a commercial soda ash having a Blaine specific surface area of 1,900 cm²/g. These accelerating agent samples were tested using the following procedures.

(1) Cup test for initial adhesion

100 Parts by weight of normal Portland cement, 5 parts by weight of accelerating agent and 50 parts by weight of water were placed in a 180 ml polyethylene cup and mixed for 15 seconds. The cup was placed upside down and the time until the slurry did not drip from the cup opening is determined. The shorter dripping time indicates better initial adhesion.

(2) Vicat needle test for initial setting

The start and end of setting were determined by the Vicat needle test according to JIS R5201 Setting Time Test, using a standard Vicat needle for the starting point, in which a penetrating depth of 39 mm was determined as the starting point and 0 mm as the end point.

The earlier beginning and end of setting indicates better initial setting.

TABLE 1

| Sample No. | Calcined alunite | Slaked lime | Sodium carbonate | Type II anhydrous gypsum | Cup test | Vicat test start (min) | needle end (min) |
|---|---|---|---|---|---|---|---|
| 1 | 75 | 0 | 0 | 25 | more than 10 min | 50 | 180 |
| 2 | 75 | 5 | 0 | 20 | 5 min | 30 | 120 |
| 3 | 50 | 5 | 20 | 25 | 90 sec | 6 | 14 |
| 4 | 55 | 0 | 20 | 25 | 120 sec | 7 | 15 |
| 5 | 60 | 5 | 20 | 15 | 100 sec | 5 | 12 |
| 6 | 70 | 5 | 20 | 5 | 80 sec | 4 | 10 |
| 7 | 75 | 5 | 20 | — | 60 sec | 2 | 5 |
| 8 | 70 | 10 | 20 | — | 60 sec | 1.5 | 4 |

The components of the accelerating agent in the above Table are in % by weight.

As can be seen from the above table, conventional accelerating agents based on calcined alunite and gypsum have smaller initial adhesion and insufficient initial setting as compared with those according to the present invention.

EXAMPLE 2

The cup test and Vicat needle test were performed with samples of cement accelerating agents according to the present invention with compositions shown in Table 2 using the same procedures as for example 1. The combined test results are shown in Table 2.

TABLE 2

| Sample No. | Calcined alunite | Slaked lime | Sodium carbonate | Cup test (sec) | Vicat test Start (min) | needle end (min) |
|---|---|---|---|---|---|---|
| 9 | 65 | 15 | 20 | 30 | 2 | 5 |
| 10 | 60 | 20 | 20 | 15 | 4 | 12 |
| 11 | 55 | 25 | 20 | 5 | 9 | 13 |
| 12 | 50 | 30 | 20 | 0 | 12 | 16 |
| 13 | 80 | 5 | 15 | 120 | 5 | 11 |
| 14 | 77 | 5.5 | 17.5 | 60 | 3 | 6 |
| 15 | 75 | 5 | 20 | 60 | 2 | 5 |
| 16 | 72.5 | 5 | 22.5 | 60 | 2 | 5 |
| 17 | 70.3 | 4.7 | 25 | 60 | 2 | 5.5 |
| 18 | 65.5 | 4.5 | 30 | 60 | 2 | 7 |
| 19 | 60 | 5 | 35 | 120 | 3 | 10 |
| 20 | 80 | 10 | 10 | 120 | 8 | 12 |

The components of the accelerating agent in this Table are in % by weight.

As can be seen from Table 2, the accelerating agent containing more than 25 weight % of slaked lime (sample No. 12) showed insufficient initial setting. The accelerating agent containing less than 15 weight % of sodium carbonate (sample No. 20) and that containing more than 30 weight % of sodium carbonate (sample No. 19) were insufficient both in adhesion and initial setting. Therefore, calcined alunite should preferably be used in an amount more than 50 weight % of the accelerating agent. As described above, a cement accelerating agent comprising 50 to 85 weight % of calcined alunite, 1 to 25 weight % of lime and 15 to 30 weight % of an alkali carbonate has acceptable characteristics. Since excessive sodium carbonate reduces durability, it should be used as in minimum quantity as required.

EXAMPLE 3

Figure 1B:
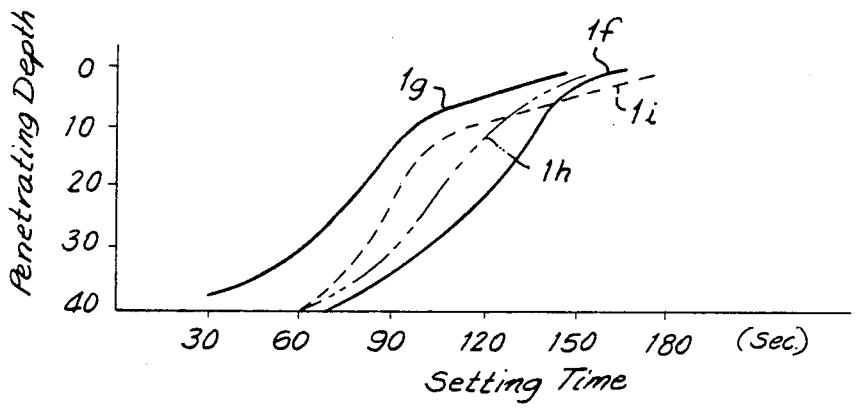
Figure 1C:
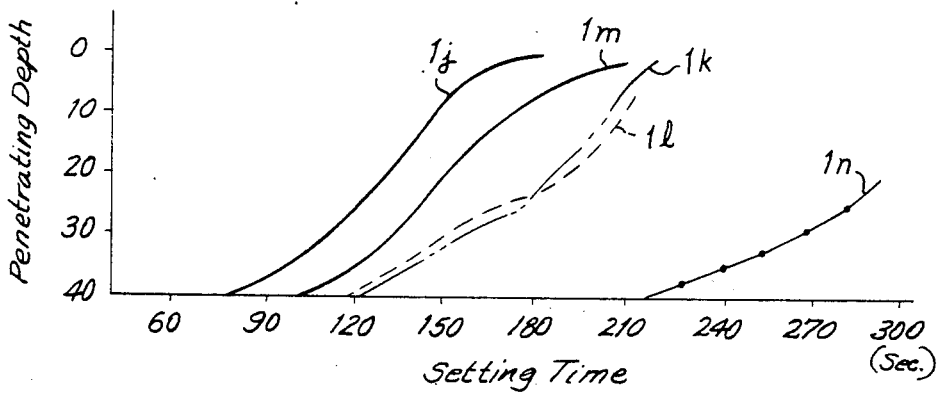

Calcined alunite (containing 5% of $K_2O$), a commercial sodium aluminate (containing 22% of $Na_2O$, 43.8% of $Al_2O_3$ and 12.5% of $Na_2CO_3$) were formulated in ratios shown in Table 3. 5 g of each composition and 100 g of normal Portland cement were placed in a cup of 5 cm in diameter and 10 cm in height and thoroughly mixed. Then, 50 g of water were added and stirred for 15 seconds. The cement mixture was immediately levelled and determined for Vicat needle penetrating depth according to the procedures specified in JIS R5201 Setting Time Test, using a standard Vicat needle for start point. The test results are shown in FIGS. 1 through 3. A penetrating depth of 40 mm corresponds to penetrating resistance of zero, 39 mm to the start point of setting and 0 mm to the end point of setting.

Referring to FIGS. 1 and 2, accelerating agents containing specified quantities of sodium aluminate and sodium carbonate (sample Nos. 1a to 1d, 1f to 1i of Table 3) start setting in 30 to 70 seconds and setting ends in about 120 seconds, however, that containing 45 weight % of calcined alunite (sample No. 1e) is very slow in setting rate. An accelerating agent containing 55 weight % of calcined alunite (sample No. 1d) has a tendency of slower setting rate as compared with samples Nos. 1a to 1c. Therefore, the content of calcined alunite should preferably be more than 50 weight %. Referring to FIG. 3, an accelerating agent free of sodium aluminate (sample No. 1n) is considerably slow in setting and does not start setting after 180 seconds. On the other hand, samples containing adequate quantities of sodium aluminate (sample Nos. 1j to 1m) have a shorter setting time. Further, referring to FIGS. 1 through 3, an accelerating agent containing 30 weight % of sodium aluminate (sample No. 1e) becomes considerably slow in setting rate as the content of calcined alunite decreases. Therefore, sodium aluminate should preferably used in from 1 to 30 weight % of the accelerating agent, and in this range the preferred compositions of the accelerating agent (weight %) are shown in Table 4.

TABLE 3

| Sample No. | Calcined alunite | Sodium aluminate | Sodium carbonate |
|---|---|---|---|
| 1a | 60 | 30 | 10 |
| -b | 60 | 25 | 15 |
| -c | 60 | 20 | 20 |
| -d | 55 | 25 | 20 |
| -e | 45 | 35 | 20 |
| -f | 70 | 25 | 5 |
| -g | 70 | 20 | 10 |
| -h | 70 | 15 | 15 |
| -i | 70 | 10 | 20 |
| -j | 75 | 20 | 5 |
| -k | 75 | 15 | 10 |
| -l | 75 | 10 | 15 |
| -m | 75 | 5 | 20 |
| -n | 75 | 0 | 25 |

TABLE 4

| | Calcined alunite | Sodium aluminate | Sodium carbonate |
|---|---|---|---|
| Best | 60–65 | 30–20 | 10–15 |
| Good | 60–70 | 25–15 | 15–10 |
| Normal | 50–70 | 20–5 | 25–5 |

Accelerating agent samples of 4-component formulation comprising calcined alunite, sodium aluminate, sodium carbonate and slaked lime were tested using the same procedures as for example 3 and the following results were obtained.

(1) An accelerating agent comprising 50 to 90 weight % of calcined alunite, 5 to 30 weight % of sodium aluminate, 5 to 30 weight % of sodium carbonate and 0.1 to 25 weight % of slaked lime has good characteristics.

(2) An accelerating agent comprising 50 to 60 weight % of calcined alunite, 15 to 25 weight % of sodium aluminate, 5 to 30 weight % of sodium carbonate and 5 to 15 weight % of slaked lime has the best characteristics.

EXAMPLE 4

The effect of adding a quantity of accelerating agent comprising calcined alunite, a carbonate and lime to cement was determined using the following procedures. 3.5 to 10 parts by weight of an accelerating agent according to the present invention was added to 100 parts by weight of normal Portland cement and the mixture was tested for initial adhesion and initial setting as in example 1. The test results are shown in Table 5. The accelerating agents used in this example comprise 75 weight % of calcined alunite, 5 weight % of slaked lime and 20 weight % of sodium carbonate. The calcined alunite and the slaked lime used are finely pulverized to a Blaine specific surface area of 7,000 $cm^2/g$.

TABLE 5

| Sample No. | Weight ratio (weight %) | Cup test (sec) | Vicat needle Start (min) | test End (min) |
|---|---|---|---|---|
| 1 | 3.5 | 120 | 10 | 18 |
| 2 | 4 | 15 | 5 | 10 |
| 3 | 5 | 5 | 1.5 | 4.5 |
| 4 | 8 | 15 | 2.5 | 4.5 |
| 5 | 10 | 60 | 4 | 8 |

As shown in Table 5, it is the most preferable to add 4 to 8 weight % of the accelerating agent according to the present invention to cement.

EXAMPLE 5

The effect of adding a quantity of accelerating agent comprising calcined alunite, a carbonate, an aluminate and a lime to cement was determined using the following procedures. 100 parts by weight of normal Portland cement were added with an accelerating agent according to the present invention of 3, 4, 5 and 6 part by weight respectively, and the Vicat needle test was performed using the same procedures as in example 3. The test results are shown in Table 6. The accelerating agent used comprises 60 weight % of calcined alunite, 25 weight % of sodium aluminate, 10 weight % of sodium carbonate and 5 weight % of slaked lime.

TABLE 6

| Ratio | Penetrating depth (mm) | | | | | | | | |
|---|---|---|---|---|---|---|---|---|---|
| | 30 sec | 40 sec | 50 sec | 60 sec | 80 sec | 100 sec | 120 sec | 180 sec | 240 sec |
| 100:3 | | | | | 40 | 39 | 35 | 20 | 12 |
| 100:4 | 39 | 28 | 20 | 17 | 10 | 10 | 5 | 0 | |
| 100:5 | 36 | 30 | 20 | 15 | 10 | 9 | 0 | | |
| 100:6 | 40 | 39 | 38 | 31 | 20 | 13 | 8 | 2 | 0 |

As shown in Table 6, it is most preferable to add 4 to 6 weight % of accelerating agent according to the present invention to cement; however, the amount to be added is, practically, 4 to 8 weight %.

EXAMPLE 6

Sample mortars were prepared by adding cement accelerating agents shown in Table 7 to normal Portland cement and were tested for Proctor penetrating resistance by determining when a needle of 1/40 in$^2$. in cross-sectional area penetrated to a depth of 1 inch. The test results are shown in Table 8.

TABLE 7

| Sample No. | (unit: weight %) | | | |
|---|---|---|---|---|
| | Calcined alunite | Slaked lime | Type II anhydrous gypsum | Sodium carbonate |
| 1 | 55 | 5 | 20 | 20 |
| 2 | 70 | 10 | — | 20 |
| 3 | A commercial accelerating agent based on sodium aluminate | | | |

The sample mortars comprise 100 parts by weight of normal Portland cement, 20 parts by weight of Toyoura standard sand, 55 parts by weight of water and 5 parts by weight of accelerating agent. The accelerating agents were prepared by pulverizing the ingredients other than sodium carbonate to a Blaine specific surface area of 7,800 cm$^2$/g and adding sodium carbonate having a Blaine specific surface area of 1,900 cm$^2$/g.

TABLE 8

| Sample No. | (unit: psi) | | | | | | | | |
|---|---|---|---|---|---|---|---|---|---|
| | 3 min | 4 min | 5 min | 6 min | 7 min | 8 min | 10 min | 15 min | 20 min |
| 1 | 30 | 100 | 230 | 500 | 760 | 970 | 1320 | 1520 | 1670 |
| 2 | 80 | 240 | 560 | 1080 | 1470 | 1760 | 2160 | 2570 | 2600 |
| 3 | 20 | 120 | 380 | 640 | 900 | 1080 | 1300 | 1550 | 1660 |

As can be seen from the above results, mortars added with accelerating agents according to the present invention have remarkably higher initial strength than others.

EXAMPLE 7

Sample mortars were prepared by adding accelerating agents shown in Table 9 to normal Portland cement and were tested for Proctor penetrating resistance by determining when a needle of 1/40 in cross-sectional area penetrated to a depth of 1 inch. The test results are shown in Table 10. The sample mortars comprise 100 parts by weight of normal Portland cement, 200 parts by weight of Toyoura standard sand, 60 parts by weight of water and 5 parts by weight of accelerated agent. Figures in the table are in weight %.

TABLE 9

| Sample No. | Calcined alunite | Sodium aluminate | Sodium carbonate | Slaked lime |
|---|---|---|---|---|
| 4a | 60 | 25 | 10 | 5 |
| -b | 70 | 15 | 10 | 5 |
| -c | 70 | 10 | 15 | 5 |
| -d | 70 | 5 | 20 | 5 |
| -e | 70 | 25 | 0 | 5 |
| -f | — | 60 | 40 | 5 |

TABLE 10

| Sample No. | (unit: psi) | | | | | |
|---|---|---|---|---|---|---|
| | 30 sec | 1 min | 2 min | 3 min | 5 min | 8 min |
| 4a | 30 | 200 | 700 | 1100 | 1700 | 2110 |
| -b | 0 | 50 | 200 | 400 | 1100 | 1830 |
| -c | 0 | 80 | 300 | 700 | 1500 | 2120 |
| -d | 0 | 30 | 120 | 300 | 1280 | 2000 |
| -e | 0 | 0 | 0 | 0 | 80 | 380 |
| -f | 0 | 0 | 0 | 230 | 700 | 1000 |

EXAMPLE 8

(Compressive strength test)

Sample mortars comprising 100 parts by weight of normal Portland cement, 200 parts by weight of Toyoura standard sand, 55 parts by weight of water and 5 to 10 parts by weight of accelerating agents were prepared using various cement accelerating agents shown in Table 11 and were tested for compressive strength according to JIS R5201. The test results are shown in Table 12.

TABLE 11

| Sample No. | Calcined alunite | Slaked lime | Sodium carbonate | Ratio of accelerating agent to cement (weight %) |
|---|---|---|---|---|
| 1 | 75 | 5 | 20 | 5 |
| 2 | 75 | 5 | 20 | 10 |
| 3 | A commercial accelerating agent based on calcium haloaluminate | | | 5 |
| 4 | A commercial accelerating agent based on calcium haloaluminate | | | 10 |
| 5 | A commercial accelerating agent based on sodium aluminate | | | 5 |
| 6 | A commercial accelerating agent based on sodium aluminate | | | 10 |

TABLE 12

| Sample No. | 3 hours | 1 day | 7 days | 28 days |
|---|---|---|---|---|
| 1 | 15.8 | 140 | 299 | 365 |
| 2 | 16.5 | 162 | 292 | 351 |
| 3 | 12.2 | 131 | 291 | 356 |
| 4 | 15.1 | 152 | 192 | 238 |
| 5 | 8.5 | 108 | 208 | 240 |
| 6 | 12.3 | 141 | 169 | 206 |

As can be seen from the above results, the accelerating agents according to the present invention have good characteristics in that the long-term strength is not reduced even when the accelerating agents are added in the amount of 10 weight % to cement.

EXAMPLE 9

(Compressive strength test)

Sample mortars comprising 100 parts by weight of normal Portland cement, 100 parts by weight of Toyoura standard sand, 55 parts by weight of water, 5 parts by weight of accelerating agent and 0.5 part by weight of Mighty 150 (Kao Corporation; β-naphthalenesulphonic acid-formaldehyde condensate) were tested for compressive strength according to JIS R5201. The test results are shown in Table 14. Compositions (weight %) of the accelerating agents used are as shown in Table 13.

TABLE 13

| Sample No. | Calcined alunite | Slaked lime | Sodium carbonate | Sodium aluminate |
|---|---|---|---|---|
| 4a | 60 | 5 | 10 | 25 |
| 4b | — | 10 | 60 | 30 |

TABLE 14

| Sample No. | 3 hours | 1 day | 7 days | 28 days |
|---|---|---|---|---|
| 4a | 17.8 | 185 | 251 | 348 |
| 4b | 8.1 | 93 | 201 | 231 |

As shown in the above results, the cement accelerating agent according to the present invention is better in short-term strength and long-term strength as compared with a conventional accelerating agent comprising sodium aluminate and sodium carbonate.

As described above, the initial setting of mortar and concrete can be remarkably improved by use of the cement accelerating agents according to the present invention, thereby providing highly durable mortar and concrete. Among the cement accelerating agents according to the present invention, those comprising calcined alunite, a carbonate and lime improve adhesion to ceiling and reduce scattering rate of mortar and concrete, thereby providing economical spraying. Further, with this type of cement accelerating agents, initial setting and adhesion of the resultant mortar or concrete will not greatly vary with content of the accelerating agents. Therefore, this type of accelerating agents are very easy to handle.

A cement accelerating agent comprising calcined alunite, a carbonate and an aluminate or that comprising calcined alunite, a carbonate, an aluminate and a lime starts setting in 5 to 10 seconds. Therefore, this type of accelerating agent can be suitably used as spraying or water stopping material under severe conditions such as in a landslide-prone area or where water flows out. Mortar or concrete added with this type of accelerating agent has a high strength and can be used as emergency repairing material or for repairing bridge understructure.

EXAMPLE 10

(Concrete spray)

Concrete materials including 350 kg of normal Portland cement, 1,140 kg of fine sand (FM2.60) and 740 kg of coarse aggregate (maximum particle size 15 mm) for 1 m³ of concrete were thoroughly mixed in a concrete mixer. The dry concrete mixture was added with 5 weight % to the cement (17.5 Kg/cm³) of an accelerating agent according to the present invention having the composition shown in the table below and was thoroughly mixed. The resultant mixture is passed through a spraying hose with compressed air, mixed with water at the end of the hose, and sprayed onto arch ceiling and wall surface in a tunnel.

| Composition of accelerating agent | 70 parts by weight of calcined alunite, 10 parts by weight of slaked lime and 20 parts by weight of sodium carbonate. The calcined alunite and slaked lime are mixed and pulverized to a Blaine specific surface area of 8,000 cm²/g, and mixed with the sodium carbonate. |
|---|---|

The spraying thickness was 15 to 25 cm for a ceiling and 20 to 25 cm for a wall surface. The scattering rate in this case was 10 to 20% for a ceiling and 5 to 10% for a wall surface.

The strength obtained by pull-out testing after 3 hours was 50 Kg/cm². The compressive strength of a sampled core was 380 Kg/cm² (after 28 days).

The same test was performed for materials (a) free of additive, (b) with 5 weight % of sodium haloaluminate-based agent added, and (C) with 5 weight % of sodium aluminate-based agent added, and the test results are shown below.

| | Condition of adhesion | | Pulling strength after 3 hr (Kg/cm²) | Core strength after 28 days |
|---|---|---|---|---|
| (a) | Additive-free | Does not adhere to wall surface. | — | — |
| (b) | Haloaluminate-based | Thickness of 10 to 20 cm for a ceiling and 20 to 25 cm for a wall surface, a scattering rate of 20 to 40% for a ceiling and 10 to 20% for a wall surface. | 48 | 350 |
| (c) | Sodium aluminate-based | Thickness of 10 to 15 cm for a ceiling (partly peeled off) and 15 to 20 cm for a wall surface, a scattering rate of 15 to 50% for a ceiling and 15 to 30% for a wall surface. | 25 | 230 |

EXAMPLE 11

(Repairing material)

An emergency repair was performed for a depression of 20 cm in width, 50 cm in length and 20 cm of average depth in a road, aiming for a road opening after 2 hours. The following repairing materials were used.

| (1) | Normal Portland cement | 100 parts by weight |
|---|---|---|
| | Accelerating agent according to the present invention | 7 parts by weight |
| | Dispersing agent (Mighty 150) | 0.1 weight % to cement |
| | Retarder (sodium citrate) | 0.1 weight % to cement |
| (2) | Sand | 1 part of the mixture (1) was added to 3 parts of sand. |
| (3) | Water/cement ratio | 35 % |

The above materials (1), (2) and (3) were mixed to prepare a mortar. The depression in the road was quickly filled with the mortar and the mortar surface was finished. It took 10 minutes from mortar preparation to surface finishing. The mortar began to harden immediately after the surface finishing. The compressive strength of the mortar was 15 Kg/cm² after 30 minutes of mortar preparation and 30 Kg/cm² after 2 hours of road closing, achieving the objective of the repair work. No defects such as cracks were observed when checking the repaired part 1 month after the repair work.

On the other hand, a concrete to which was added a conventional accelerating agent comprising 30 weight % of sodium aluminate, 60 weight % of sodium carbonate and 10 weight % of slaked lime was sprayed using the same procedures as described above. For a location where water flows out, the concrete adhered to a thickess of about 5 to 10 cm; however, it peeled off when the thickness exceeded 10 cm. For a depression in a hill, the concrete adhered up to 20 cm in thickness; however, no further adhesion was obtained. The scattering rate of the concrete was 50 to 60%.

Special steel nails were inserted in the sprayed concrete and the pulling strength was measured after 3 hours. After 28 days, a core was sampled and tested for compressive strength. The test results are shown below.

|  | Pulling strength after 3 hours (Kg/cm²) | Compressive strength (Kg/cm²) |
| --- | --- | --- |
| Accelerating agent according to the present invention | 51 | 310 |
| A conventional sodium aluminate-based accelerating agent | 23 | 205 |

EXAMPLE 12

(Concrete spray)

Concrete materials including 350 kg of normal Portland cement, 1,130 kg of fine sand (FM 2.60) and 750 kg of coarse aggregate (maximum particle size 15 mm) for 1 m³ of concrete were thoroughly mixed in a concrete mixer. The dry concrete mixture was added to the cement (17.5 Kg/m³) together with 5 weight % of an accelerating agent according to the present invention having composition shown in the table below, and was thoroughly mixed. The resultant mixture was passed through a spraying hose with compressed air, mixed with water at the end of the hose, and sprayed onto the arch ceiling and wall surface in a tunnel.

| Composition of accelerating agent | 60 parts by weight of calcined alunite, 5 parts by weight of slaked lime, 12 parts by weight of sodium carbonate and 23 parts by weight of sodium aluminate. |
| --- | --- |

The quantity of added water was 5 weight % to the cement. As a result, an average spraying thickness of 20 cm was obtained on a loosened hill where water flows out and a spraying thickness of 50 cm was continuously obtained on a depression in a hill. The scattering rate of concrete was 15 to 30% for both cases.

EXAMPLE 13

(Spraying on bridge understructure)

A dry concrete of the same formulation as Example 10. of the present invention was mixed in a dry state with 10.5 kg of calcined alunite and 0.88 kg of slaked lime per 1 m³ of the concrete. The mixture was passed by means of compressed air through a spraying hose and, at the end of the spraying hose, mixed with an aqueous solution of 4.38 kg of sodium aluminate and 1.75 kg of sodium carbonate at a mixing ratio of 50 parts of the aqueous solution to 100 parts of cement in the concrete. While mixing these materials, the resultant concrete mixture was sprayed onto deteriorated recesses, previously filled, in a bridge understructure and over the entire bridge understructure to a spraying thickness of 5 cm in order to reinforce the bridge understructure.

On the other hand, when only the dry concrete was mixed with an aqueous solution of 4.38 kg of sodium aluminate and 1.75 kg of sodium carbonate and sprayed using the same procedures as described above, more than half of the concrete fell down and desired uniform spraying thickness was not obtained.

EXAMPLE 14

(Water stopping)

In a tunnel work, there is required to excavate a loosened hill. The hill is first hardened by an injection process before excavation. When boring an injection hole, a large quantity of water flowed out. The injection rod was inserted into the injection hole and the periphery of the injection rod was wrapped with cloth to temporarily stop the water flowing out around the periphery. Then, the periphery was filled with a powder mixture of 7 parts by weight of an accelerating agent according to the present invention comprising 60 parts by weight of calcined alunite, 25 parts by weight of sodium aluminate and 15 parts by weight of sodium carbonate and 100 parts by weight of a high-early-strength Portland cement. As a result, water flow was stopped, and injection material did not flow out around the rod periphery when injection work was started after 5 to 10 minutes. By repeating this water stopping procedure, the injection work for hardening the loosened hill was completed and tunnel excavation can be continued.

We claim:

1. A cement accelerating agent comprising 50 to 84 weight % of calcined alunite, prepared by calcining alunite at a temperature between 350° and 750° C., 15 to 30 weight % of an alkali metal carbonate and 1 to 25 weight % of lime.

2. A cement accelerating agent comprising 50 to 94 weight % of calcined alunite, prepared by calcining alunite at a temperature between 350° and 750° C., 5 to 30 weight % of an alkali metal carbonate and 1 to 30 weight % of an alkali metal aluminate.

3. A cement accelerating agent comprising 50 to 89.9 weight % of calcined alunite, prepared by calcining alunite at a temperature between 350° and 750° C., 5 to 30 weight % of an alkali metal carbonate, 5 to 30 weight % of an alkali metal aluminate and 0.1 to 25 weight % of lime.

4. A cement accelerating agent according to claim 1 wherein the lime is quicklime or slaked lime.

5. A cement accelerating agent according to claim 3 wherein the lime is quicklime or slaked lime.

* * * * *